United States Patent
Nie et al.

(10) Patent No.: US 12,503,430 B1
(45) Date of Patent: Dec. 23, 2025

(54) METHOD FOR PREPARING CYANO SULFONYL FLUORIDE COMPOUNDS

(71) Applicant: Zhejiang Normal University, Jinhua (CN)

(72) Inventors: Xingliang Nie, Jinhua (CN); Jin Yan, Jinhua (CN); Yuzhi Ma, Jinhua (CN); Jihong Yu, Jinhua (CN); Likang Yu, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 0 days.

(21) Appl. No.: 19/214,766

(22) Filed: May 21, 2025

(30) Foreign Application Priority Data

Dec. 6, 2024 (CN) .......................... 202411784196.8

(51) Int. Cl.
| | | |
|---|---|---|
| *C07C 303/10* | (2006.01) | |
| *B01J 31/02* | (2006.01) | |
| *B01J 31/14* | (2006.01) | |
| *B01J 35/39* | (2024.01) | |
| *C07C 319/20* | (2006.01) | |
| *C07D 205/04* | (2006.01) | |
| *C07D 211/54* | (2006.01) | |

(52) U.S. Cl.
CPC .......... *C07C 303/10* (2013.01); *B01J 31/0232* (2013.01); *B01J 31/0237* (2013.01); *B01J 31/0271* (2013.01); *B01J 31/146* (2013.01); *B01J 35/39* (2024.01); *C07C 319/20* (2013.01); *C07D 205/04* (2013.01); *C07D 211/54* (2013.01); *C07C 2601/10* (2017.05); *C07C 2602/08* (2017.05); *C07C 2603/26* (2017.05)

(58) Field of Classification Search
CPC .................................................. C07C 303/10
See application file for complete search history.

(56) References Cited

FOREIGN PATENT DOCUMENTS

| CN | 111039737 A | 4/2020 | |
|---|---|---|---|
| CN | 112174855 A | 1/2021 | |
| CN | 117645581 A | 3/2024 | |
| JP | 2001354641 A | * 12/2001 | |
| WO | WO-2017102557 A1 | * 6/2017 | ........ H01M 10/0525 |
| WO | WO2022252404 A1 | 12/2022 | |

OTHER PUBLICATIONS

Shao "Oxidation Potentials of Functionalized Sulfone Solvents for High-Voltage Li-Ion Batteries: A Computational Study." Journal of Physical Chemistry B, 2012, 116(10), 3235-3238.*
Dauncey "Photoinduced Remote Functionalisations by Iminyl Radical Promoted C—C and C—H Bond Cleavage Cascades" Angew. Chem. Int. Ed. 2018, 57, 744-748.*
First Office Action dated Jan. 15, 2025 cited in CN202411784196.8, 7 pages.
Notification to Grant dated Mar. 3, 2025, cited in CN202411784196.8, 3 pages.
Chen Pu, "Study on Sulfonylation of Carbon-Carbon σ-bonds in Three-membered/Four-membered Carbocyclic Compounds", China Excellent Master's Dissertation Full-text Database Engineering Technology I Series, No. 2. Feb. 15, 2023, 92 pages.
Liu Yu et al., "Visible-Light-Catalyzed Tandem Cyanoalkylsulfonylation/Cyclization of Alkynes", Chinese Journal of Organic Chemistry, Mar. 25, 2021, pp. 2290-2301, vol. 41.

* cited by examiner

*Primary Examiner* — David K O'Dell
(74) *Attorney, Agent, or Firm* — Cooper Legal Group, LLC

(57) ABSTRACT

A method for preparing cyano sulfonyl fluoride compounds is provided. Oxime ether compounds are used as free radical precursors, and under the condition of photocatalyst regulation, and in combination with the strategy of free radical sulfur dioxide insertion, the process involves photocatalytic oxidation, C—C bond cleavage rings, free radical SO₂ insertion and fluorination to achieve cyano/fluorosulfonyl reaction of oxime ether, yielding cyano sulfonyl fluoride products.

5 Claims, 4 Drawing Sheets

METHOD FOR PREPARING CYANO SULFONYL FLUORIDE COMPOUNDS

CROSS-REFERENCE TO RELATED APPLICATIONS

This application claims priority to Chinese Patent Application No. 202411784196.8, filed on Dec. 6, 2024, the contents of which are hereby incorporated by reference.

TECHNICAL FIELD

The present disclosure relates to the technical fields of chemical synthesis and medicinal chemistry, and in particular to a method for preparing cyano sulfonyl fluoride compounds.

BACKGROUND

Sulfonyl fluoride is a core group of a new generation of click chemical reaction, which is widely used in many fields such as organic synthesis, material and medicine research and development, and it has become one of the hot spots in chemical research in recent years. Therefore, it is of certain research and application value to develop a simple and efficient synthesis method of multifunctional sulfonyl fluoride compounds. Cyano group may be used to synthesize various functional groups such as carboxylic acid, amine, amide and ketone, and it is also common in bioactive molecules such as medicine and natural products.

At present, there are three main strategies for the synthesis of sulfonyl fluoride compounds: 1, constructing sulfonyl fluoride groups in situ; 2, modular synthesis based on sulfonyl fluoride blocks; 3, direct fluorosulfonylation. In 2024, Liao Saihu's research group reported a photosensitizer and copper cooperated to catalyze the addition of fluorosulfonyl radicals to alkyl olefins and further cyanation, this reaction belongs to the type of direct fluorosulfonylation, and the existing synthesis methods may not synthesize remote cyanosulfonyl fluoride compounds in one step.

SUMMARY

In view of the above-mentioned shortcomings in the prior art, the purpose of the present disclosure is to provide a method for preparing cyano sulfonyl fluoride compounds, and to construct remote cyano sulfonyl fluoride compounds in one step by free radical $SO_2$ insertion strategy. In the present disclosure, oxime ether compounds are used as free radical precursors, and oxime ether substrates are subjected to photocatalytic oxidation and reduction under the conditions of sulfur dioxide source, organic base free radical initiator, fluorine source and photocatalyst to generate nitrogen free radicals, C—C bond cleavage rings, free radical $SO_2$ insertion and fluorination. This achieves cyano/fluorosulfonyl reaction of oxime ether, and cyano sulfonyl fluoride products are obtained.

In order to solve the above technical problems, the present disclosure adopts the following technical scheme.

A method for preparing cyano sulfonyl fluoride compounds includes following steps:

in an organic solvent, using oxime ether compounds as free radical precursors, and in a protective atmosphere, adding photocatalyst, sulfur dioxide source and organic base free radical initiator, and stirring a mixture under the illumination condition to allow the oxime ether compounds to subject to photocatalytic oxidation and reduction to generate nitrogen free radicals, and followed by C—C bond cleavage rings and free radical $SO_2$ insertion;

subsequently, adding fluorine source to undergo fluorination, achieving cyano/fluorosulfonyl reaction of oxime ether to obtain cyano sulfonyl fluoride compounds;

where a general reaction formula is as follows:

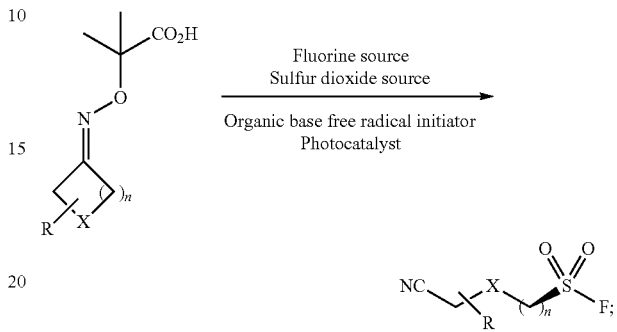

where R is one of hydrogen, alkyl, aryl, ester group and heterocyclic ring, X is one of carbon, oxygen and sulfur, n is one of 1, 2 and 3, and the sulfur dioxide source is 1,4-diazabicyclo [2.2.2]octane-1,4-dium-1,4-disulfonic acid, abbreviated as DABSO.

In the present disclosure, oxime ether compounds are used as free radical precursors, and in a protective atmosphere, photocatalyst, sulfur dioxide source and organic base free radical initiator are added, and then mixed and stirred under illumination conditions, and then fluorine source is added; in combination with the strategy of free radical sulfur dioxide insertion fluorination, the oxime ether compounds are selected as free radical precursors, and are subjected to photocatalytic oxidation and reduction to generate nitrogen free radicals, C—C bond cleavage rings, free radical $SO_2$ insertion and fluorination processes, thus achieving cyano/fluorosulfonyl reaction of oxime ether; and by employing the free radical $SO_2$ insertion, remote cyano sulfonyl fluoride compounds are constructed in one step. So far, the in-situ construction of fluorosulfonyl/cyano bifunctional reaction has not been reported.

In an optional embodiment of the present disclosure, the oxime ether compounds are selected from one or more of four-membered cyclic oxime ether, five-membered cyclic oxime ether, six-membered cyclic oxime ether, sulfur heterocyclic oxime ether and oxygen heterocyclic oxime ether.

In an optional embodiment of the present disclosure, the organic base free radical initiator is selected from one or more of tetramethylguanidine, triethylenediamine, 2,6-dimethylpyridine, triethylamine, isopropylamine and di-tert-butyl peroxide, where tetramethylguanidine is abbreviated as TMG.

In an optional embodiment of the present disclosure, the fluorine source is selected from one or more of potassium dihydrofluoride, N-fluorodiphenyl sulfonamide and selective fluorine reagent, where the selective fluorine reagent is abbreviated as Selectfluor.

In an optional embodiment of the present disclosure, the photocatalyst is selected from one or more of acid red 87, 2,4,5,6-tetra(9-carbazolyl)-isophthalonitrile, 2,4,6-triphenylpyran boron tetrafluoride, rhodamine B, tripyridine ruthenium chloride hexahydrate, fac-Ir(ppy)3, Ir(ppy)$_2$bpyPF$_6$, Ir[ppy]$_2$(dtbbpy)PF$_6$, Ir[dF(CF$_3$)ppy]$_2$(dtbbpy)PF$_6$, 10-methyl-9-mesityl acridine perchlorate, 3,6,-di-tert-butyl- 9-trimethylphenyl-10-phenylacridine-10-tetrafluoroborate, 9-m-methyl-10-methyl acridine-10-hydroiodate, 9-trimethyl-10-methyl acridine-10-hexafluorophosphate, 9-m dimethyl-10-phenyl acridine-10-hydrochloride, and 9-m-dimethyl-2,7-dimethyl-10-phenyl acridine-10-tetrafluoroborate; where acid red 87 is abbreviated as Eosin Y, 2,4,5,6-tetra(9-carbazolyl)-isophthalonitrile is abbreviated as 4CzIPN, 2,4,6-triphenylpyran boron tetrafluoride is abbreviated as TPT, and 10-methyl-9-mesityl acridine perchlorate is abbreviated as Mes-Acr-Me-ClO$_4$, and 3,6,-di-tert-butyl-9-trimethylphenyl-10-phenylacridine-10-tetrafluoroborate is abbreviated as Mes-(t-Bu)$_2$Acr-Ph-BF$_4$.

In an optional embodiment of the present disclosure, a molar ratio of oxime ether compounds to photocatalyst is 1:0.02-0.1, and a molar ratio of oxime ether compounds to the sulfur dioxide source is 1:2-4.

In an optional embodiment of the present disclosure, a molar ratio of oxime ether compounds to the organic base free radical initiator is 1:1-4.

In an optional embodiment of the present disclosure, a molar ratio of oxime ether compounds to the fluorine source is 1:1.5-4.

In an optional embodiment of the present disclosure, the illumination condition is that LED lamps are used for illumination, photocatalytic irradiation wavelength is 460 nanometers (nm), irradiation duration time is 0.8-1.2 hours, reaction temperature is room temperature, and reaction duration is 2-2.5 hours.

In an optional embodiment of the present disclosure, the organic solvent is dichloroethane, acetonitrile, tetrahydrofuran, N,N dimethylformamide, dimethyl sulfoxide, 1,4-dioxane or isopropanol, where dichloroethane is abbreviated as DCE.

Compared with the prior art, the disclosure has the following beneficial effects.

In the present disclosure, oxime ether compounds are used as free radical precursors, and in a protective atmosphere, photocatalyst, sulfur dioxide source and organic base free radical initiator are added, and then mixed and stirred under illumination conditions, and then fluorine source is added. In combination with the strategy of free radical sulfur dioxide insertion fluorination, the oxime ether compounds are selected as free radical precursors, and are subjected to photocatalytic oxidation and reduction to generate nitrogen free radicals, C—C bond cleavage rings, free radical SO$_2$ insertion and fluorination processes.

The reaction yield of the disclosure is good, the synthesis efficiency is high, and the cyano group and fluorosulfonyl group in the obtained product structure may be variously transformed, which shows that the method of the disclosure has certain synthesis application value.

The disclosure provides a new method for the synthesis of cyano sulfonyl fluoride compounds, and cyano sulfonyl fluoride is a part of the molecular structure of various drugs, which is expected to be widely used in the fields of organic synthesis, drug development, polymer materials and the like.

The disclosure adopts free radical reaction, which may be initiated by simple illumination, with mild reaction conditions, high yield, low requirements for instruments and equipment, simple operation, and the sulfur dioxide source used in the disclosure is easy to prepare and cheap.

DETAILED DESCRIPTION OF THE EMBODIMENTS

Figure 1:
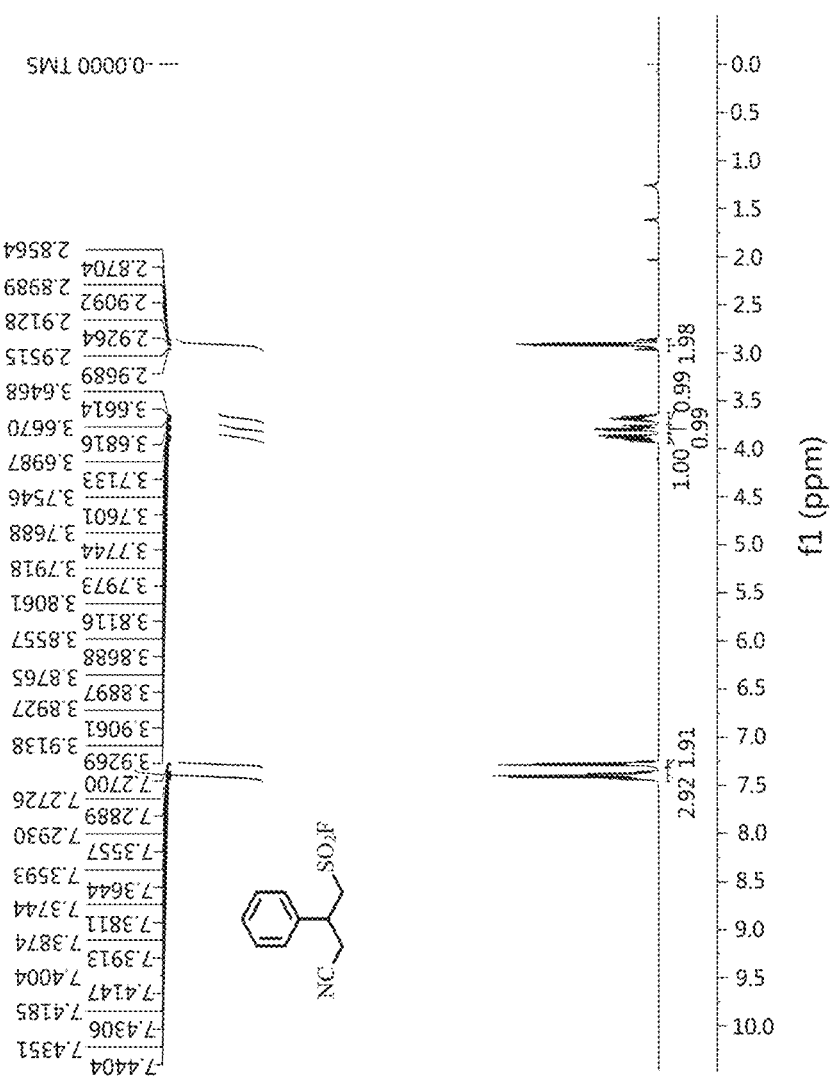
FIG. 1 is the Proton Nuclear Magnetic Resonance Spectrum ($^1$H NMR) of the product prepared in Embodiment 4 of the present disclosure.
Figure 2:
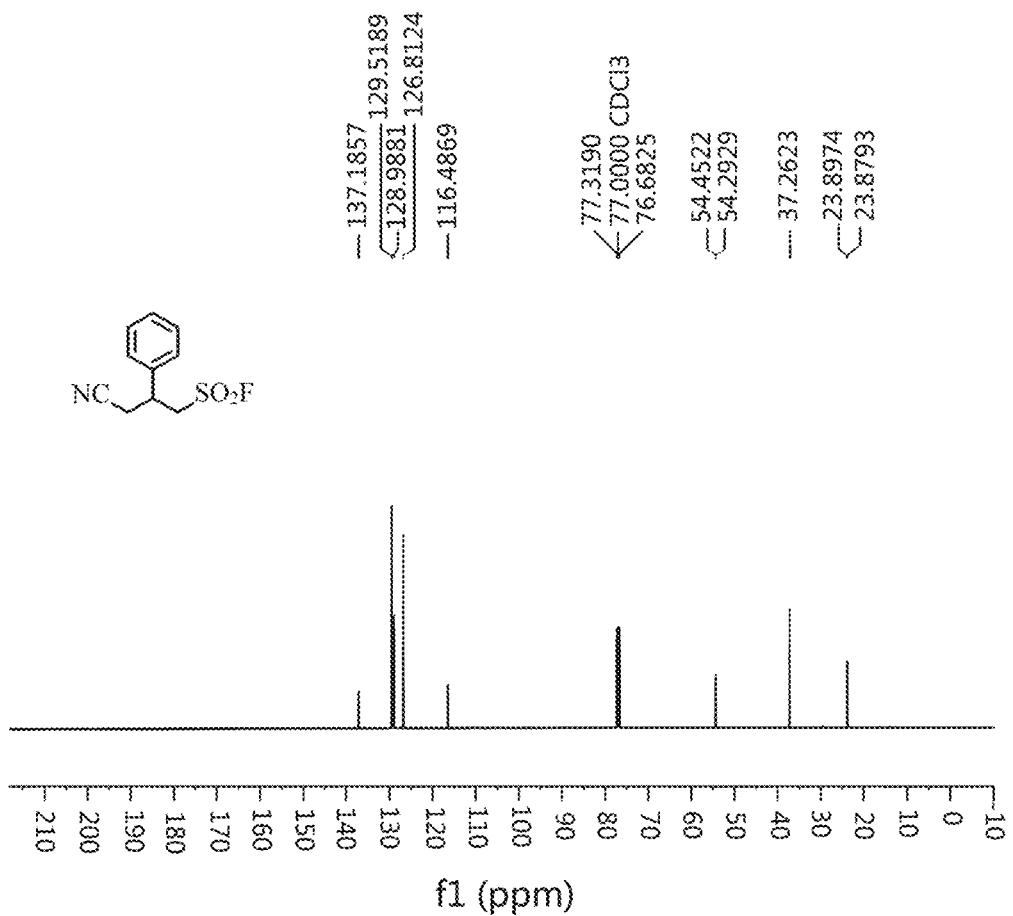
FIG. 2 is the Carbon-13 Nuclear Magnetic Resonance Spectrum ($^{13}$C NMR) of the product prepared in Embodiment 4 of the present disclosure.
Figure 3:
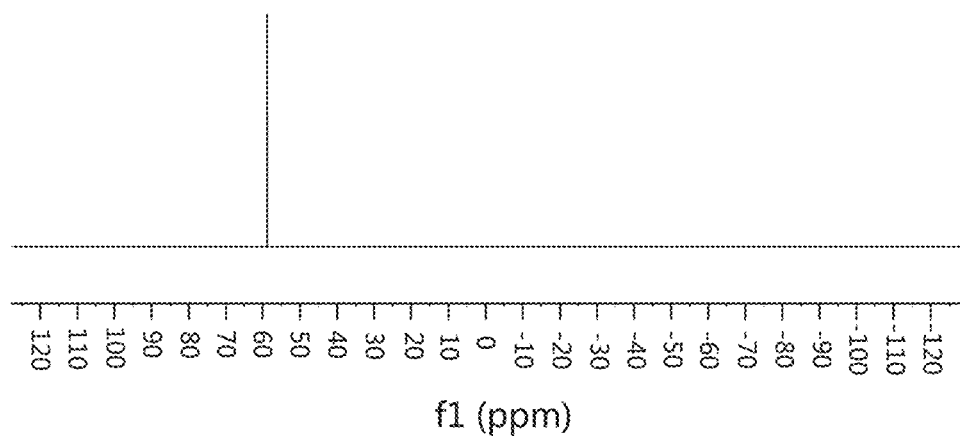
FIG. 3 is the Fluorine-19 Nuclear Magnetic Resonance Spectrum ($^{19}$F NMR) of the product prepared in Embodiment 4 of the present disclosure.
Figure 4:
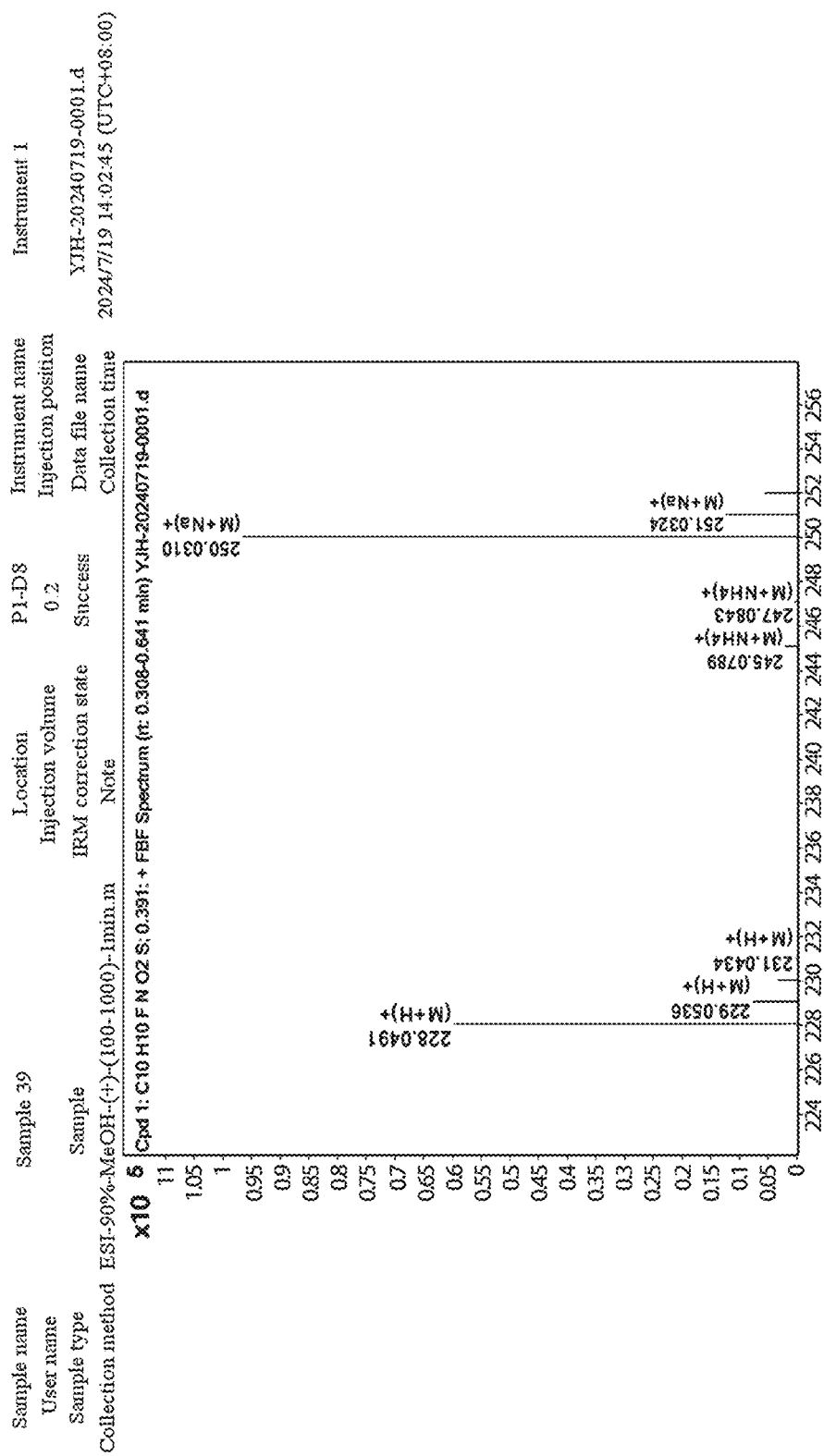
FIG. 4 is the mass spectrum of the product prepared in Embodiment 4 of the present disclosure.

In the following, the technical scheme in the embodiments of the present disclosure will be described clearly and completely with better embodiments and data. Obviously, the described embodiments are only a part of the embodiments of the present disclosure, but not the whole embodiments. Based on the embodiments in the present disclosure, all other embodiments obtained by ordinary technicians in the field without creative labor belong to the scope of protection of the present disclosure.

It should be noted that all technical terms used in the present disclosure are only for the purpose of describing specific embodiments, and are not intended to limit the scope of protection of the present disclosure. Unless otherwise specified, various raw materials, reagents, instruments and equipment used in the following embodiments of the present disclosure may be purchased from the market or prepared by existing methods.

Embodiment 1

The synthetic route is:

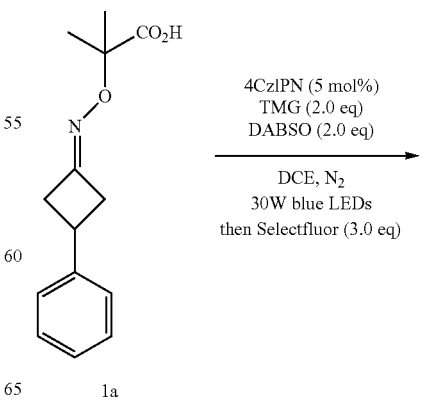

1a

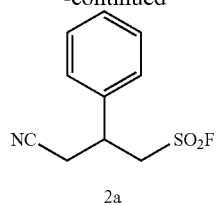

2a

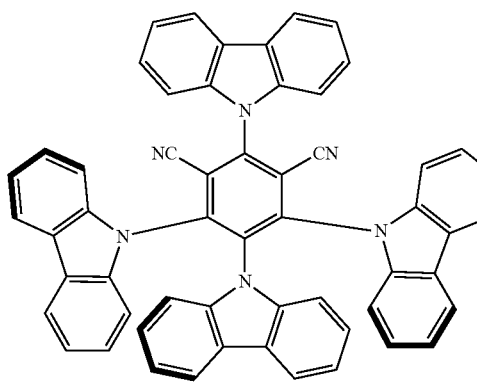

4CzIPN 0.1 millimole (mmol) of 1a is added to a dry Schlenker reaction tube, and then 0.005 mmol of 4CzIPN, 0.2 mmol of DABSO, 0.2 mmol of tetramethylguanidine and 4.0 mL of dichloroethane are added under nitrogen atmosphere. A reaction mixture is irradiated with a blue light-emitting diode (LED) lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with $Na_2SO_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 63%.

The data of hydrogen spectrum, carbon spectrum, fluorine spectrum and high resolution mass spectrum of the product are as follows:

$^1$H NMR, 400 megahertz (MHz), chloroform: δ 7.44-7.36 (multiplet (m), 3 hydrogen (H)), 7.29-7.27 (m, 2H), 3.93-3.86 (m, 1H), 3.81-3.75 (m, 1H), 3.72-3.65 (m, 1H), 2.97-2.86 (m, 2H);

$^{13}$C NMR, 101 MHz, chloroform: δ 137.2, 129.5, 129.0, 126.8, 116.5, 54.4 (doublet of triplets, coupling constant (d, J)=16.0 Hertz (Hz)), 37.3, 23.9 (d, J=1.8 Hz);

$^{19}$F NMR, 377 MHz, chloroform: δ 58.8;

High-Resolution Mass Spectrometry (HRMS) Electrospray Ionization (ESI) mass-to-charge ratio (m/z) calcd. for $C_{10}H_{11}FNO_2S$ [M+H]$^+$ 228.0490, found 228.0491.

Embodiment 2

The synthetic route is:

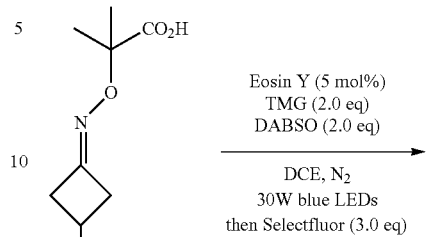

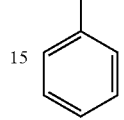

1a

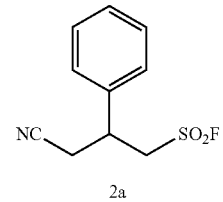

2a

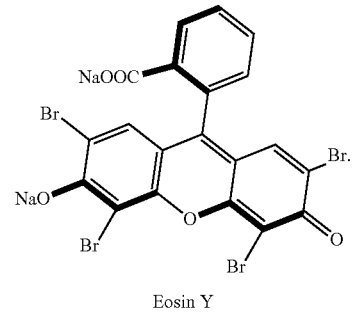

Eosin Y 0.1 mmol of 1a is added to a dry Schlenker reaction tube, and then 0.005 mmol of Eosin Y, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with $Na_2SO_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 39%.

The data of hydrogen spectrum, carbon spectrum, fluorine spectrum and high resolution mass spectrum of the product are as follows:

$^1$H NMR, 400 MHZ, chloroform: δ 7.44-7.36 (m, 3H), 7.29-7.27 (m, 2H), 3.93-3.86 (m, 1H), 3.81-3.75 (m, 1H), 3.72-3.65 (m, 1H), 2.97-2.86 (m, 2H);

$^{13}$C NMR, 101 MHZ, chloroform: δ 137.2, 129.5, 129.0, 126.8, 116.5, 54.4 (d, J=16.0 Hz), 37.3, 23.9 (d, J=1.8 Hz);

$^{19}$F NMR, 377 MHz, chloroform: δ 58.8;

HRMS (ESI) m/z calcd. for $C_{10}H_{11}FNO_2S$ [M+H]$^+$ 228.0490, found 228.0491.

Embodiment 3

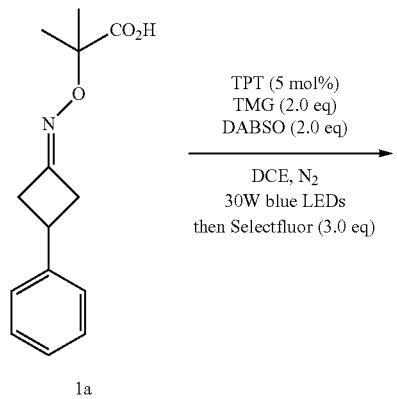

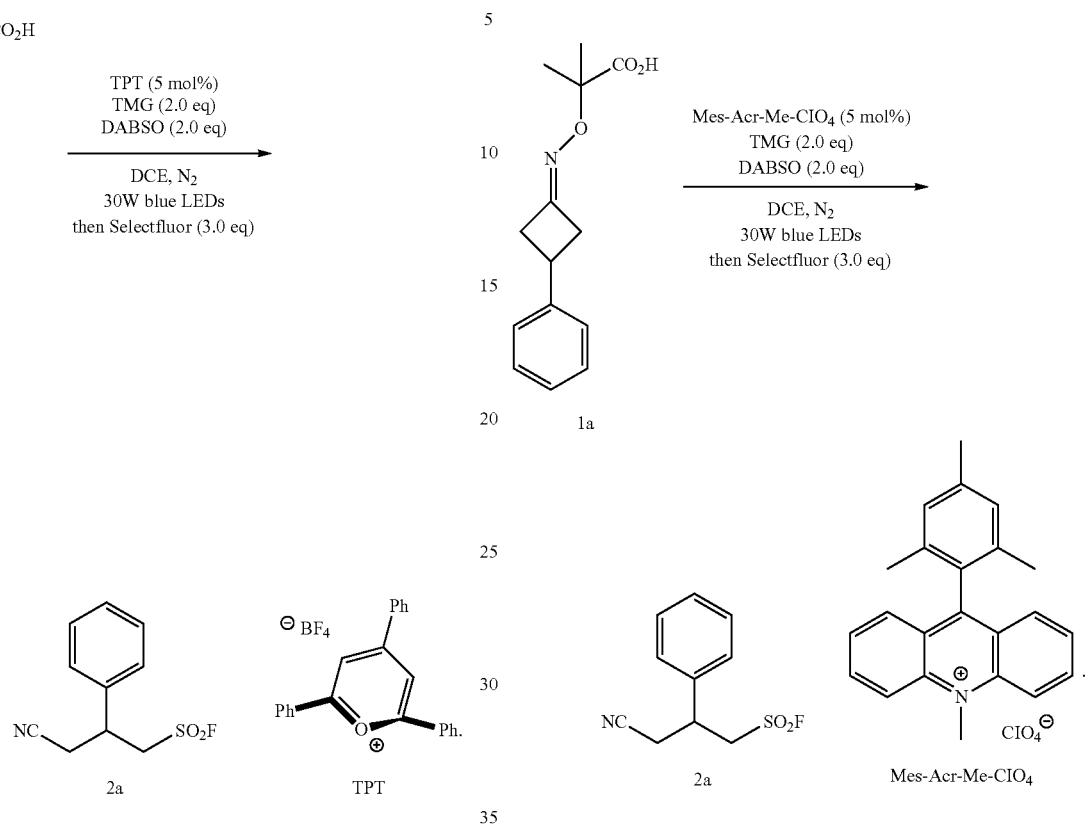

0.1 mmol of 1a is added to a dry Schlenker reaction tube, and then 0.005 mmol of TPT, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with $Na_2SO_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 67%.

The data of hydrogen spectrum, carbon spectrum, fluorine spectrum and high resolution mass spectrum of the product are as follows:

$^1$H NMR, 400 MHZ, chloroform: δ 7.44-7.36 (m, 3H), 7.29-7.27 (m, 2H), 3.93-3.86 (m, 1H), 3.81-3.75 (m, 1H), 3.72-3.65 (m, 1H), 2.97-2.86 (m, 2H);

$^{13}$C NMR, 101 MHz, chloroform: δ 137.2, 129.5, 129.0, 126.8, 116.5, 54.4 (d, J=16.0 Hz), 37.3, 23.9 (d, J=1.8 Hz);

$^{19}$F NMR, 377 MHz, chloroform: δ 58.8;

HRMS (ESI) m/z calcd. for $C_{10}H_{11}FNO_2S$ [M+H]$^+$ 228.0490, found 228.0491.

Embodiment 4

The synthetic route is:

0.1 mmol of 1a is added to a dry Schlenker reaction tube, and then 0.005 mmol of Mes-Acr-Me-ClO$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with $Na_2SO_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 74%.

The data of hydrogen spectrum, carbon spectrum, fluorine spectrum and high resolution mass spectrum of the product are as follows:

$^1$H NMR, 400 MHz, chloroform: δ 7.44-7.36 (m, 3H), 7.29-7.27 (m, 2H), 3.93-3.86 (m, 1H), 3.81-3.75 (m, 1H), 3.72-3.65 (m, 1H), 2.97-2.86 (m, 2H);

$^{13}$C NMR, 101 MHz, chloroform: δ 137.2, 129.5, 129.0, 126.8, 116.5, 54.4 (d, J=16.0 Hz), 37.3, 23.9 (d, J=1.8 Hz);

$^{19}$F NMR, 377 MHz, chloroform: δ 58.8;

HRMS (ESI) m/z calcd. for $C_{10}H_{11}FNO_2S$ [M+H]$^+$ 228.0490, found 228.0491.

Embodiment 5

The synthetic route is:

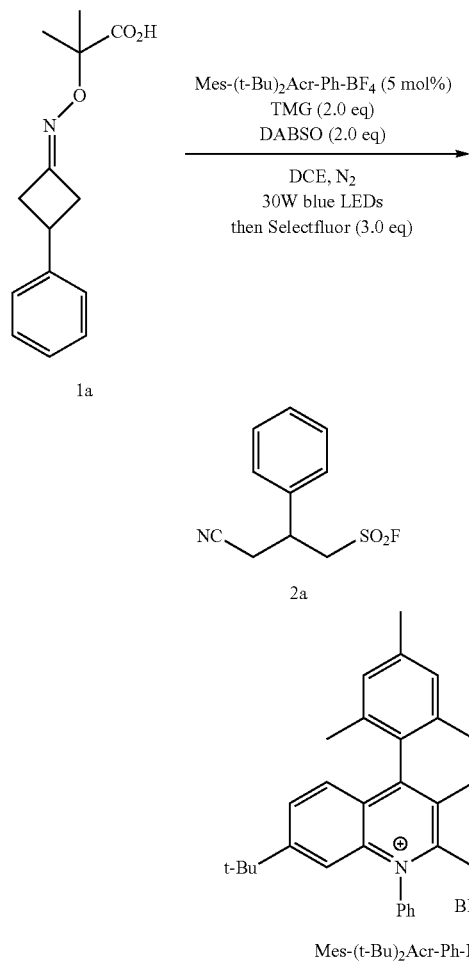

0.1 mmol of 1a is added to a dry Schlenker reaction tube, and then 0.005 mmol of Mes-(1-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 93%.

The data of hydrogen spectrum, carbon spectrum, fluorine spectrum and high resolution mass spectrum of the product are as follows:

$^1$H NMR, 400 MHz, chloroform: δ 7.44-7.36 (m, 3H), 7.29-7.27 (m, 2H), 3.93-3.86 (m, 1H), 3.81-3.75 (m, 1H), 3.72-3.65 (m, 1H), 2.97-2.86 (m, 2H);

$^{13}$C NMR, 101 MHz, chloroform: δ 137.2, 129.5, 129.0, 126.8, 116.5, 54.4 (d, J=16.0 Hz), 37.3, 23.9 (d, J=1.8 Hz);

$^{19}$F NMR, 377 MHz, chloroform: δ 58.8;

HRMS (ESI) m/z calcd. for C$_{10}$H$_{11}$FNO$_2$S [M+H]$^+$ 228.0490, found 228.0491.

Embodiment 6

The synthetic route is:

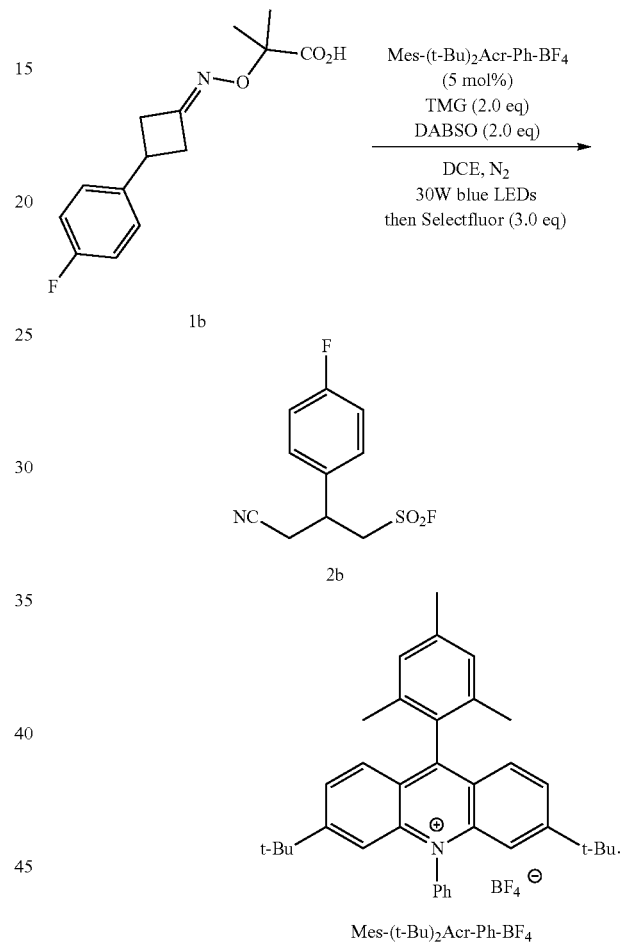

0.1 mmol of 1b is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 69%.

The data of hydrogen spectrum, carbon spectrum, fluorine spectrum and high resolution mass spectrum of the product are as follows:

$^1$H NMR, 400 MHZ, chloroform: δ 7.30-7.26 (m, 2H), 7.15-7.09 (m, 2H), 3.92-3.85 (m, 1H), 3.80-3.74 (m, 1H), 3.73-3.67 (m, 1H), 2.96-2.85 (m, 2H);

$^{13}$C NMR, 101 MHz, chloroform: δ 162.8 (d, J=248.9 Hz), 132.9 (d, J=3.3 Hz), 128.7 (d, J=8.3 Hz), 116.6 (d, J=21.9 Hz), 116.3, 54.4 (d, J=16.1 Hz), 36.7, 24.1;

$^{19}$F NMR, 377 MHz, chloroform: δ 59.1,-112.0;

HRMS (ESI) m/zcalcd. for $C_{10}H_{11}F_2NO_2S$ [M+H]$^+$ 246.0395, found 246.0393.

Embodiment 7

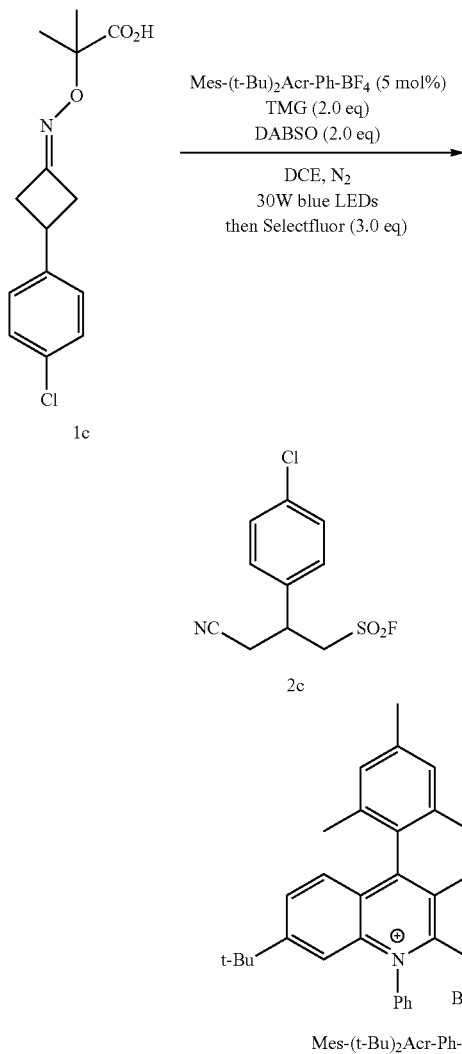

0.1 mmol of 1c is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 95%.

The data of hydrogen spectrum, carbon spectrum, fluorine spectrum and high resolution mass spectrum of the product are as follows:

$^1$H NMR, 400 MHZ, chloroform: δ 7.42-7.39 (m, 2H), 7.26-7.23 (m, 2H), 3.92-3.85 (m, 1H), 3.80-3.74 (m, 1H), 3.72-3.65 (m, 1H), 2.96-2.85 (m, 2H);

$^{13}$C NMR, 101 MHz, chloroform: δ 135.5, 135.0, 129.8, 128.3, 116.2, 54.2 (d, J=16.3 Hz), 36.8, 23.9 (d, J=1.8 Hz);

$^{19}$F NMR, 377 MHz, chloroform: δ 59.2;

HRMS (ESI) m/z calcd. for $C_{10}H_{10}ClFNO_2S$ [M+H]$^+$ 262.0100, found 262.0092.

Embodiment 8

The synthetic route is:

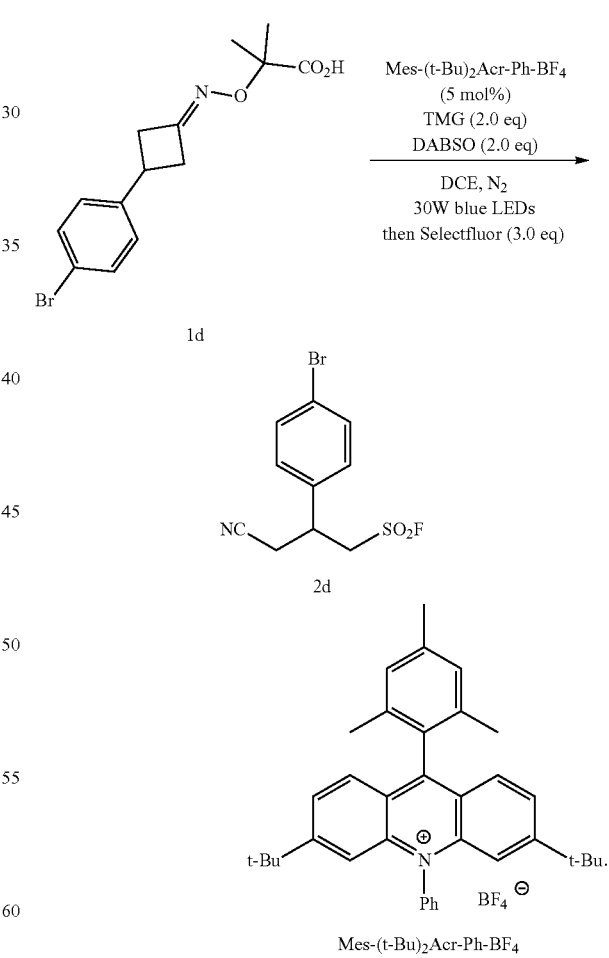

0.1 mmol of 1d is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with $Na_2SO_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 82%.

The data of hydrogen spectrum, carbon spectrum, fluorine spectrum and high resolution mass spectrum of the product are as follows:

$^1$H NMR, 400 MHz, chloroform: δ 6.31 (d, J=8.2 Hz, 2H), 5.93 (d, J=8.2 Hz, 2H), 2.66-2.59 (m, 1H), 2.542-2.48 (m, 1H), 2.45-2.38 (m, 1H), 1.72-1.59 (m, 2H);

$^{13}$C NMR, 101 MHz, chloroform: δ 136.1, 132.8, 128.5, 123.2, 116.1, 54.2 (d, J=16.5 Hz), 36.9, 23.9 (d, J=1.8 Hz);

$^{19}$F NMR, 377 MHz, chloroform: δ 59.2;

HRMS (ESI) m/z calcd. for $C_{10}H_{11}BrFNO_2S$ [M+H]$^+$ 305.595, found 305.9592.

Embodiment 9

The synthetic route is:

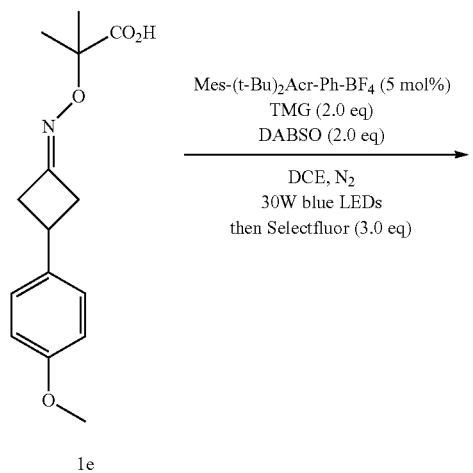

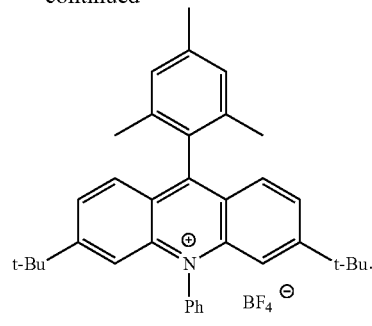

Mes-(t-Bu)$_2$Acr-Ph-BF$_4$ 0.1 mmol of 1e is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with $Na_2SO_4$, filtered and concentrated. Further purification is performed by column chromatography or preparative thin-layer chromatography on silica gel; the eluent is petroleum ether and ethyl acetate with a volume ratio of 5:1, and the light yellow oily product is obtained with a yield of 83%.

The data of hydrogen spectrum, carbon spectrum, fluorine spectrum and high resolution mass spectrum of the product are as follows:

$^1$H NMR, 400 MHZ, chloroform: δ 7.22-7.19 (m, 2H), 6.95-6.91 (m, 2H), 3.91-3.83 (m, 1H), 3.81 (s, 3H), 3.78-3.73 (m, 1H), 3.68-3.62 (m, 1H), 2.94-2.83 (m, 2H);

$^{13}$C NMR, 101 MHz, chloroform: δ 159.8, 129.0, 128.0, 116.6, 114.8, 55.3, 54.6 (d, J=15.5 Hz), 36.6, 24.1 (d, J=1.9 Hz);

$^{19}$F NMR, 377 MHz, chloroform: δ 58.9;

HRMS (ESI) m/z calcd. for $C_{11}H_{13}FNO_3S$ [M+H]$^+$ 258.0595, found 258.0596.

Embodiment 10

The synthetic route is:

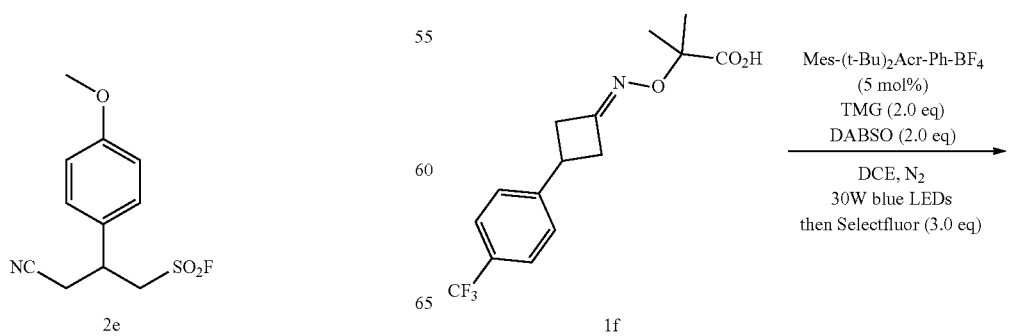

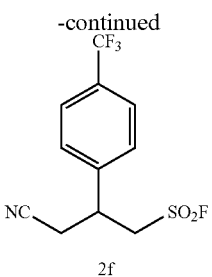

2f

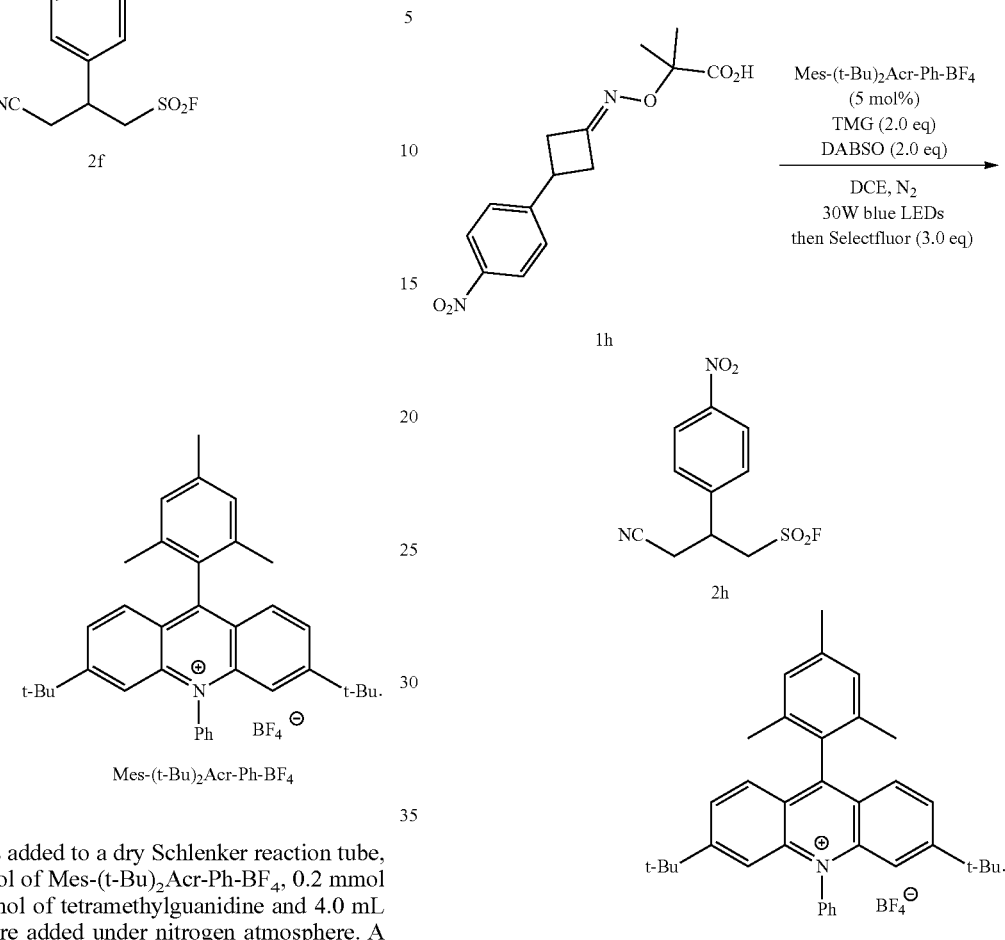

0.1 mmol of 1f is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 80%.

The data of hydrogen spectrum, carbon spectrum, fluorine spectrum and high resolution mass spectrum of the product are as follows:

$^1$H NMR, 400 MHz, chloroform: δ 7.70 (d, J=8.1 Hz, 2H), 7.44 (d, J=8.1 Hz, 2H), 3.96-3.89 (m, 1H), 3.85-3.79 (m, 1H), 3.77-3.74 (m, 1H), 2.99-2.88 (m, 2H);

$^{13}$C NMR, 101 MHz, chloroform: δ 140.9, 131.2 (quartet, coupling constant (q, J)=32.8 Hz), 127.5, 126.5 (q, J=3.8 Hz), 123.6 (q, J=273.3 Hz), 53.9 (d, J=16.7 Hz), 37.1, 23.7 (d, J=1.8 Hz);

$^{19}$F NMR, 377 MHz, chloroform: δ 59.1,-62.8;

HRMS (ESI) m/z calcd. for C$_{11}$H$_{10}$F$_4$NO$_2$S [M+H]$^+$ 296.0303, found 296.0365.

Embodiment 11

The synthetic route is:

0.1 mmol of 1h is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 64%.

The data of hydrogen spectrum, carbon spectrum, fluorine spectrum and high resolution mass spectrum of the product are as follows:

$^1$H NMR, 400 MHZ, chloroform: δ 8.31 (d, J-8.5 Hz, 2H), 7.53 (d, J=8.5 Hz, 2H), 4.00-3.92 (m, 1H), 3.89-3.82 (m, 2H), 3.05-2.92 (m, 2H);

$^{13}$C NMR, 101 MHz, chloroform: δ 148.3, 143.8, 128.3, 124.8, 115.7, 53.9 (d, J=17.4 Hz), 37.2, 23.8 (d, J=1.6 Hz);

$^{19}$F NMR, 377 MHz, chloroform: δ 59.6;
HRMS (ESI) m/z calcd. for $C_{11}H_{10}F_4NO_2S$ [M+H]$^+$ 296.0303, found 296.0365.

Embodiment 12

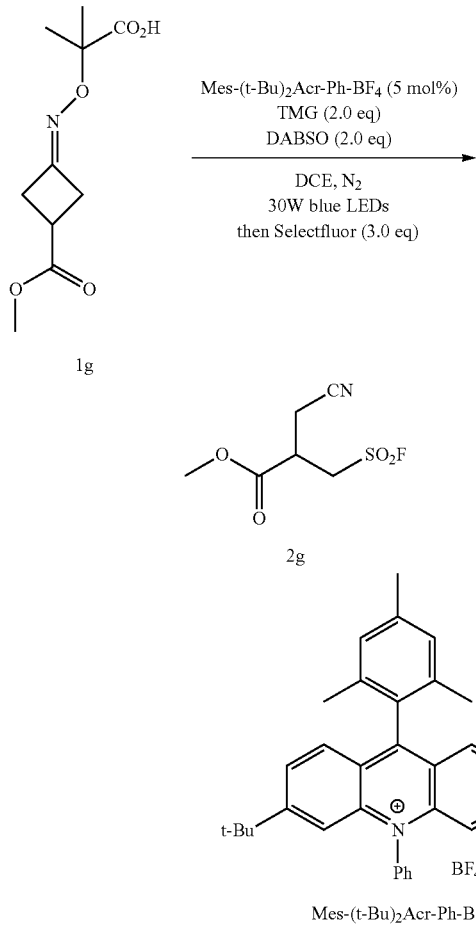

0.1 mmol of 1g is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 20:1, and the colorless oily product is obtained with a yield of 68%.

The data of hydrogen spectrum, carbon spectrum, fluorine spectrum and high resolution mass spectrum of the product are as follows:

$^1$H NMR, 400 MHZ, chloroform: δ 4.12-4.05 (m, 1H), 3.86 (s, 3H), 3.83-3.76 (m, 1H), 3.43-3.37 (m, 1H), 3.04-2.94 (m, 2H);

$^{13}$C NMR, 101 MHZ, chloroform: δ 168.4, 115.7, 53.7, 50.1 (d, J=19.0 Hz), 37.1, 18.6 (d, J=1.4 Hz);
$^{19}$F NMR, 377 MHz, chloroform: δ 59.0;
HRMS (ESI) m/z calcd. for $C_6H_9FNO_4S$ [M+H]$^+$ 210.0231, found 210.0227.

Embodiment 13

The synthetic route is:

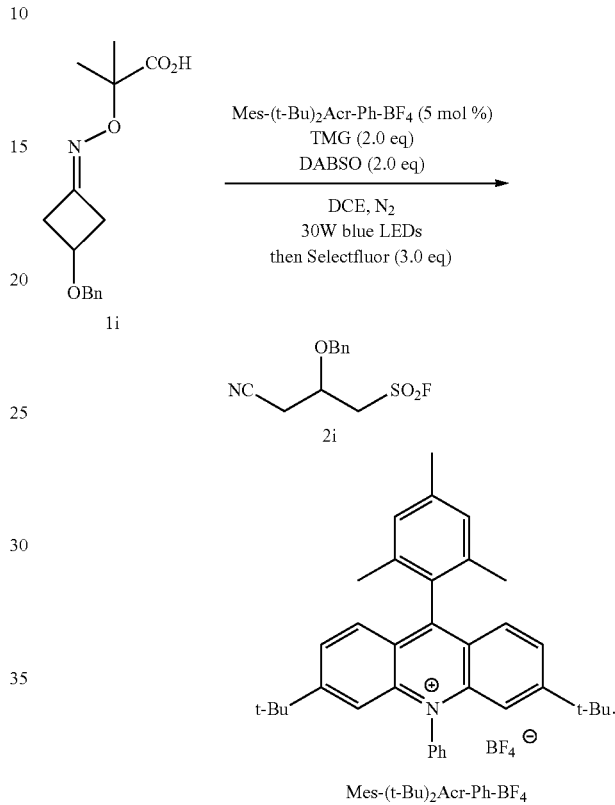

0.1 mmol of 1i is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 76%.

The data of hydrogen spectrum, carbon spectrum, fluorine spectrum and high resolution mass spectrum of the product are as follows:

$^1$H NMR, 400 MHZ, chloroform: δ 7.42-7.34 (m, 5H), 4.74-4.67 (m, 2H), 4.33-4.27 (m, 1H), 3.80-3.74 (m, 1H), 3.67-3.61 (m, 1H), 2.81-2.69 (m, 2H);

$^{13}$C NMR, 101 MHz, chloroform: δ 135.6, 128.9, 128.8, 128.3, 115.5, 73.2, 69.4, 54.1 (d, J=16.2 Hz), 23.0 (d, J=2.1 Hz);

¹⁹F NMR, 377 MHz, chloroform: δ 61.5;
HRMS (ESI) m/z calcd. for $C_{11}H_{13}FNO_3S$ $[M+H]^+$ 258.0595, found 258.0655.

Embodiment 14

The synthetic route is:

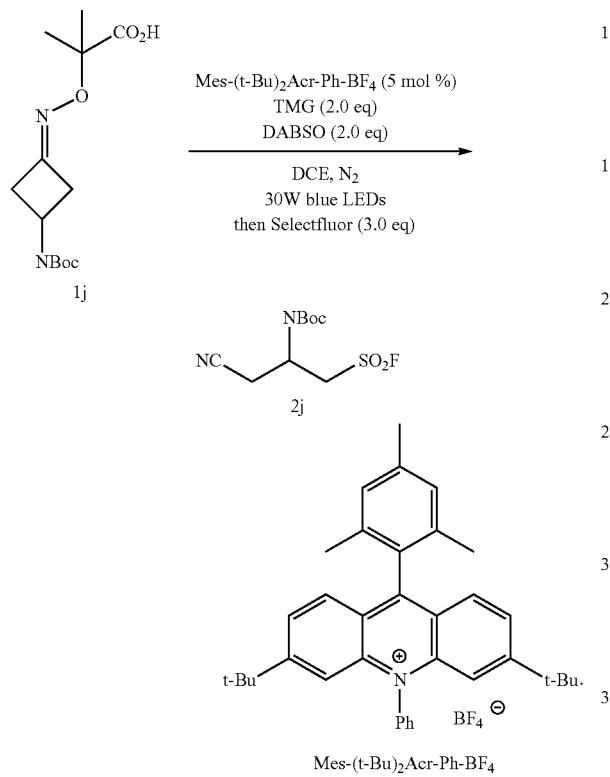

Mes-(t-Bu)₂Acr-Ph-BF₄

0.1 mmol of 1j is added to a dry Schlenker reaction tube, and then 0.005 mmol of Mes-(t-Bu)₂Acr-Ph-BF₄, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na₂SO₄, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 69%.

The data of hydrogen spectrum, carbon spectrum, fluorine spectrum and high resolution mass spectrum of the product are as follows:

¹H NMR, 400 MHZ, dimethyl sulfoxide: 87.51 (d, J=8.7 Hz, 1H), 4.34-4.25 (m, 1H), 4.19-4.13 (m, 1H), 4.02-3.95 (m, 1H), 2.90-2.74 (m, 2H), 1.47 (s, 9H);

¹³C NMR, 101 MHz, dimethyl sulfoxide: 8155.0, 118.0, 79.4, 53.3 (d, J=13.0 Hz), 44.0, 28.5, 23.3 (d, J=2.7 Hz);

¹⁹F NMR, 377 MHz, dimethyl sulfoxide: 861.0;
HRMS (ESI) m/z calcd. for $C_9H_{16}FN2O4S$ $[M+H]^+$ 267.0810, found 267.0943.

Embodiment 15

The synthetic route is:

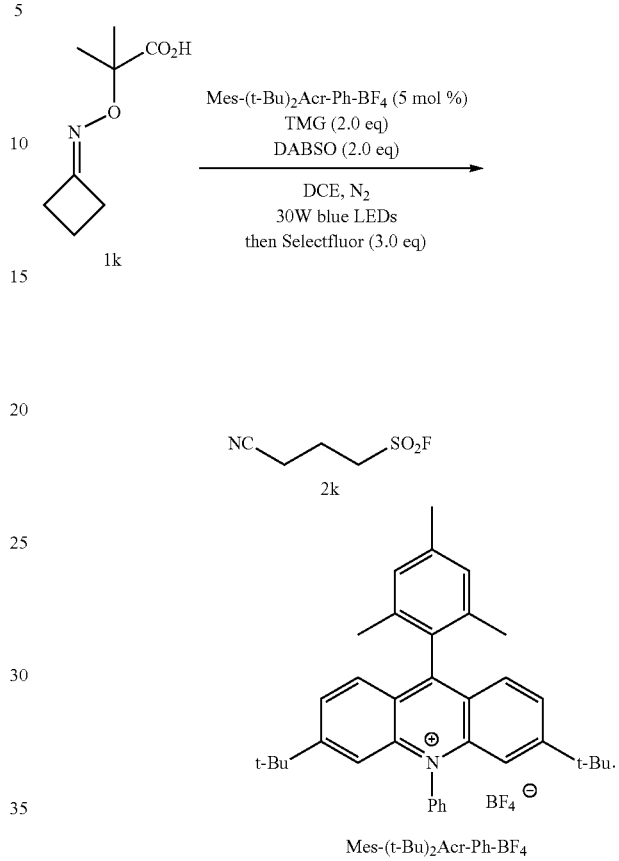

Mes-(t-Bu)₂Acr-Ph-BF₄

0.1 mmol of 1k is added to a dry Schlenker reaction tube, and then 0.005 mmol of Mes-(t-Bu)₂Acr-Ph-BF₄, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na₂SO₄, filtered and concentrated. Further purification is performed by column chromatography or preparative thin-layer chromatography on silica gel; the eluent is petroleum ether and ethyl acetate with a volume ratio of 10:1, and the colorless oily product is obtained with a yield of 75%.

The data of hydrogen spectrum, carbon spectrum, fluorine spectrum and high resolution mass spectrum of the product are as follows:

¹H NMR, 400 MHZ, chloroform: δ 3.60-3.55 (m, 2H), 2.66 (triplet, coupling constant (t, J)=7.0 Hz, 2H), 2.37-2.30 (m, 2H);

¹³C NMR, 101 MHz, chloroform: δ 117.3, 48.9 (d, J=18.4 Hz), 19.9, 15.7;

¹⁹F NMR, 377 MHz, chloroform: δ 55.1;
HRMS (ESI) m/z calcd. for $C_4H_7FNO_2S$ $[M+H]^+$ 152.0177, found 152.0178.

Embodiment 16

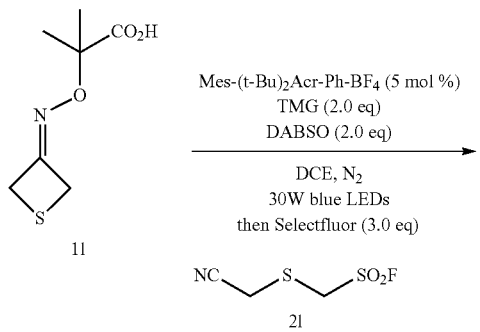

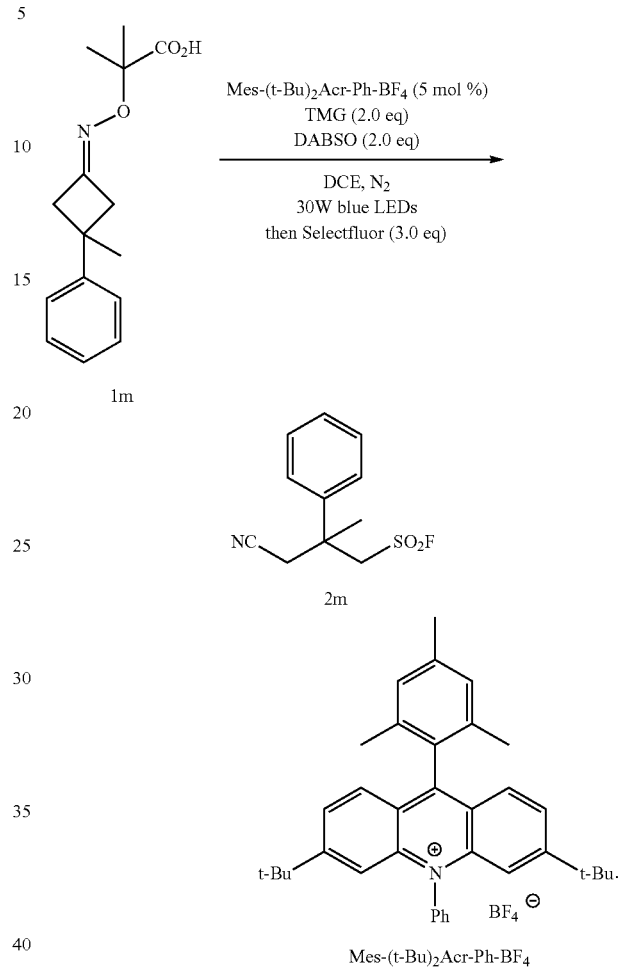

0.1 mmol of 11 is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 50:1, and the colorless oily product is obtained with a yield of 62%.

The data of hydrogen spectrum, carbon spectrum, fluorine spectrum and high resolution mass spectrum of the product are as follows:

$^1$H NMR, 400 MHz, chloroform: δ 4.49 (d, J=3.0 Hz, 2H), 3.72 (d, J=0.8 Hz, 2H);

$^{13}$C NMR, 101 MHz, chloroform: δ 114.3, 49.8 (d, J=21.7 Hz), 17.8;

$^{19}$F NMR, 377 MHz, chloroform: δ 52.7;

HRMS (ESI) m/z calcd. for C$_3$H$_4$FNO$_2$S$_2$[M+H]$^+$ 168.9662, found 168.9662.

Embodiment 17

The synthetic route is:

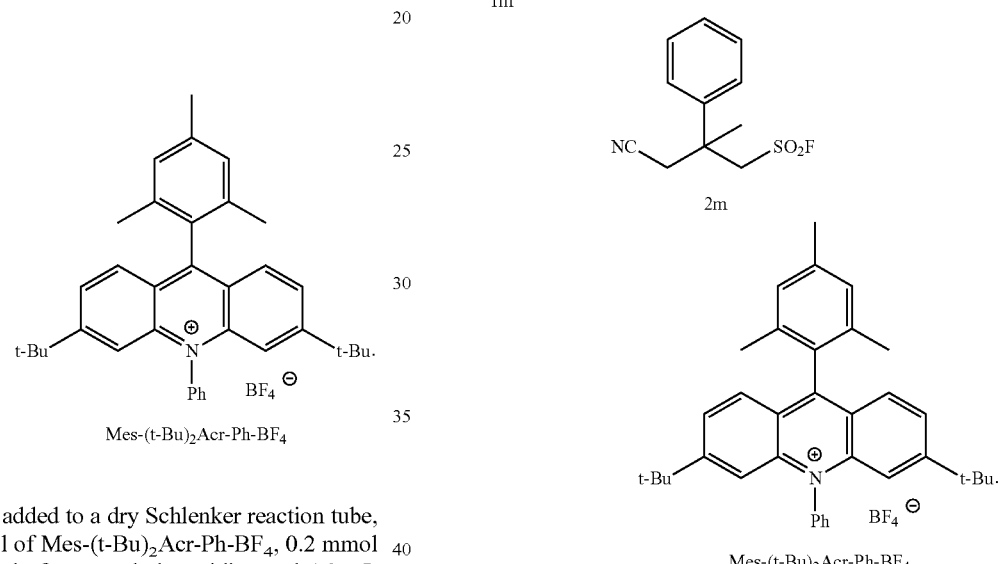

0.1 mmol of 1m is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 94%.

The data of hydrogen spectrum, carbon spectrum, fluorine spectrum and high resolution mass spectrum of the product are as follows:

$^1$H NMR, 400 MHZ, chloroform: δ 7.46-7.42 (m, 2H), 7.39-7.35 (m, 3H), 3.91-3.82 (m, 2H), 3.11 (q, J=21.7 Hz, 2H), 1.86 (s, 3H);

$^{13}$C NMR, 101 MHZ, chloroform: δ 140.0, 129.3, 128.5, 125.2, 116.5, 60.5 (d, J=13.2 Hz), 39.3, 29.4, 25.2 (d, J=1.8 Hz);

$^{19}$F NMR, 377 MHz, chloroform: δ 66.1;
HRMS (ESI) m/z calcd. for $C_{11}H_{13}FNO_2S$ [M+H]$^+$ 242.0646, found 242.0643.

Embodiment 18

The synthetic route is:

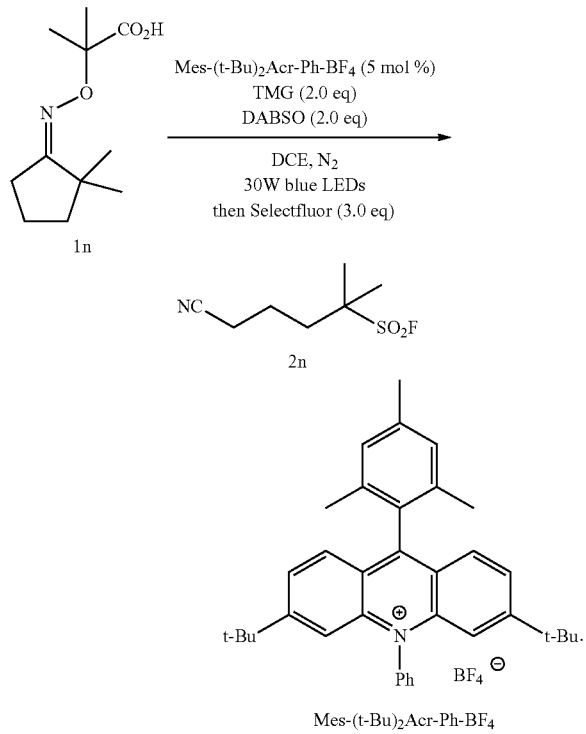

0.1 mmol of 1n is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 10:1, and the colorless oily product is obtained with a yield of 82%.

The data of hydrogen spectrum, carbon spectrum, fluorine spectrum and high resolution mass spectrum of the product are as follows:

$^1$H NMR, 400 MHz, chloroform: δ 2.44 (t, J=6.9 Hz, 2H), 2.05-2.00 (m, 2H), 1.91-1.83 (m, 2H), 1.58 (d, J=1.0 Hz, 6H);
$^{13}$C NMR, 101 MHz, chloroform: δ 118.6, 63.7 (d, J=10.7 Hz), 36.1, 22.4, 20.2 (d, J=0.9 Hz), 17.3;
$^{19}$F NMR, 377 MHz, chloroform: δ 34.6;
HRMS (ESI) m/z calcd. for $C_7H_{12}FNNaO2S$ [M+H]$^+$ 216.0465, found 216.0466.

Embodiment 19

The synthetic route is:

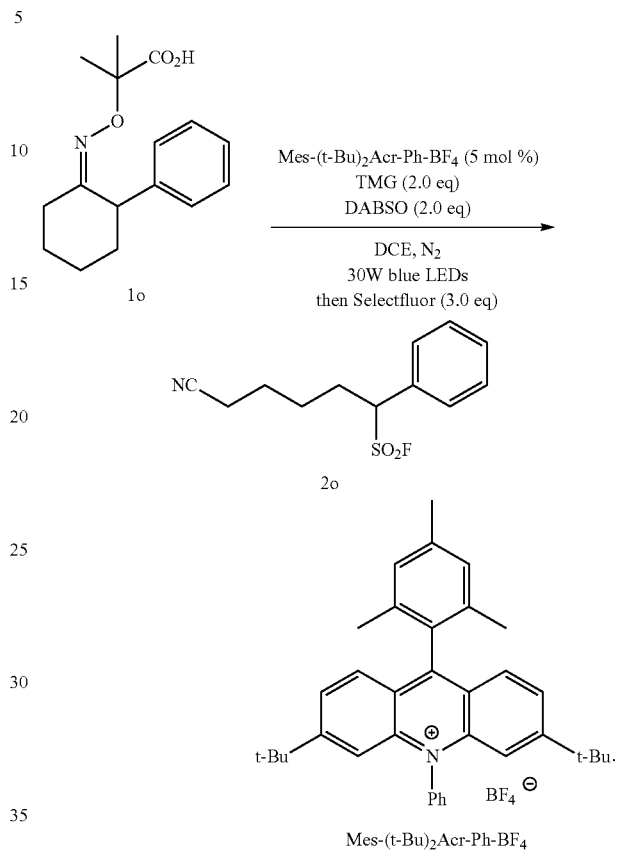

0.1 mmol of 1o is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 60%.

The data of hydrogen spectrum, carbon spectrum, fluorine spectrum and high resolution mass spectrum of the product are as follows:

$^1$H NMR, 400 MHZ, chloroform: δ 7.47-7.40 (m, 5H), 4.44 (doublet of doublets, coupling constant (dd, J)=10.8, 4.5 Hz, 1H), 2.49-2.40 (m, 1H), 2.36-2.24 (m, 3H), 1.78-1.63 (m, 2H), 1.53-1.38 (m, 2H);
$^{13}$C NMR, 101 MHz, chloroform: δ 130.2, 129.6, 129.4, 129.2, 118.9, 67.8 (d, J=12.8 Hz), 29.3, 25.6, 24.8, 16.9;
$^{19}$F NMR, 377 MHz, chloroform: δ 45.6;

HRMS (ESI) m/z calcd. for $C_{14}H_{24}FN_2O_4S$ $[M+H]^+$ 256.0803, found 256.0658.

Embodiment 20

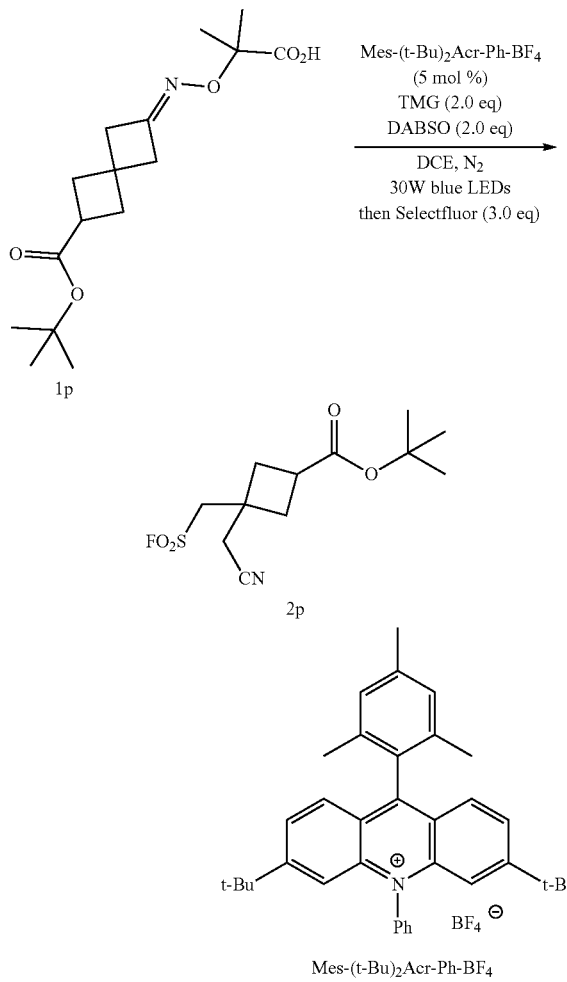

1p

2p

Mes-(t-Bu)$_2$Acr-Ph-BF$_4$ 0.1 mmol of 1p is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 92%.

The data of hydrogen spectrum, carbon spectrum, fluorine spectrum and high resolution mass spectrum of the product are as follows:

$^1$H NMR, 400 MHZ, chloroform: δ 4.02 (d, J=9.4 Hz, 2H), 3.92-3.88 (m, 4H), 3.04 (singlet(s), 2H), 1.45 (s, 9H);

$^{13}$C NMR, 101 MHz, chloroform: δ 155.6, 115.5, 81.0, 57.6, 55.5 (d, J=16.1 Hz), 33.1, 28.2, 25.2 (d, J=1.5 Hz);

$^{19}$F NMR, 377 MHz, chloroform: δ 64.5;

HRMS (ESI) m/z calcd. for $C_{11}H_{18}FN_2O_4S$ $[M+H]^+$ 293.0966, found 293.0920.

Embodiment 21

The synthetic route is:

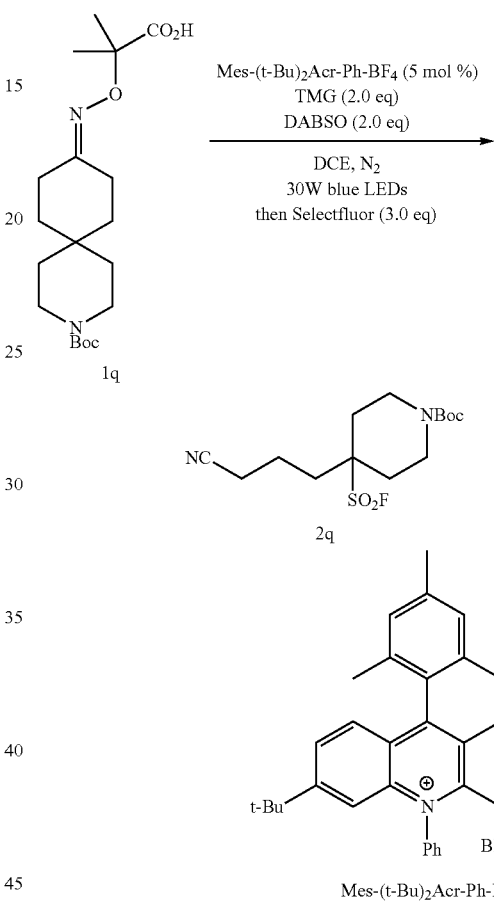

1q

2q

Mes-(t-Bu)$_2$Acr-Ph-BF$_4$ 0.1 mmol of 1q is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 3:1, and the colorless oily product is obtained with a yield of 71%.

The data of hydrogen spectrum, carbon spectrum, fluorine spectrum and high resolution mass spectrum of the product are as follows:

¹H NMR, 400 MHZ, chloroform: δ 3.95 (s, 2H), 3.19 (t, J=12.2 Hz, 2H), 2.46 (t, J=6.7 Hz, 2H), 2.29-2.21 (m, 2H), 2.17-2.12 (m, 2H), 1.97-1.89 (m, 4H), 1.47 (s, 9H);
¹³C NMR, 101 MHz, chloroform: δ 154.2, 118.5, 80.6, 65.5 (d, J-9.4 Hz), 31.3, 29.6, 28.3, 19.7 (d, J-0.93 Hz), 17.4;
¹⁹F NMR, 377 MHz, chloroform: δ 39.3;
HRMS (ESI) m/z calcd. for $C_{14}H_{24}FN_2O_4S$ [M+H]⁺ 335.1436, found 335.1361.

Embodiment 22

The synthetic route is:

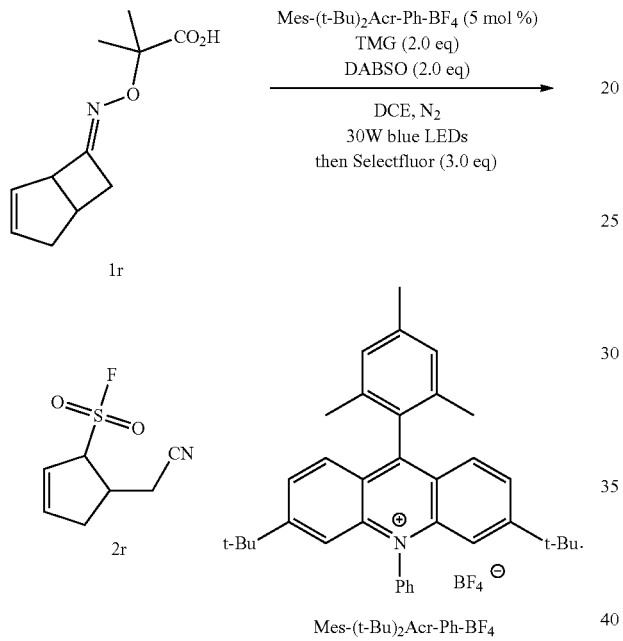

0.1 mmol of 1r is added to a dry Schlenker reaction tube, and then 0.005 mmol of Mes-(t-Bu)₂Acr-Ph-BF₄, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na₂SO₄, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 90%.

The data of hydrogen spectrum, carbon spectrum, fluorine spectrum and high resolution mass spectrum of the product are as follows:
¹H NMR, 400 MHz, chloroform: δ 5.96-5.94 (m, 1H), 5.74-5.71 (m, 1H), 3.90-3.84 (m, 1H), 3.67-3.58 (m, 1H), 3.16-2.99 (m, 2H), 2.83-2.66 (m, 2H);
¹³C NMR, 101 MHz, chloroform: δ 130.8, 129.1, 116.5, 62.5 (d, J=15.6 Hz), 44.8, 34.9, 22.4;

¹⁹F NMR, 377 MHz, chloroform: δ 46.2;
HRMS (ESI) m/z calcd. for $C-H_9FNO_2S$ [M+H]⁺ 190.0333, found 190.0336.

Embodiment 23

The synthetic route is:

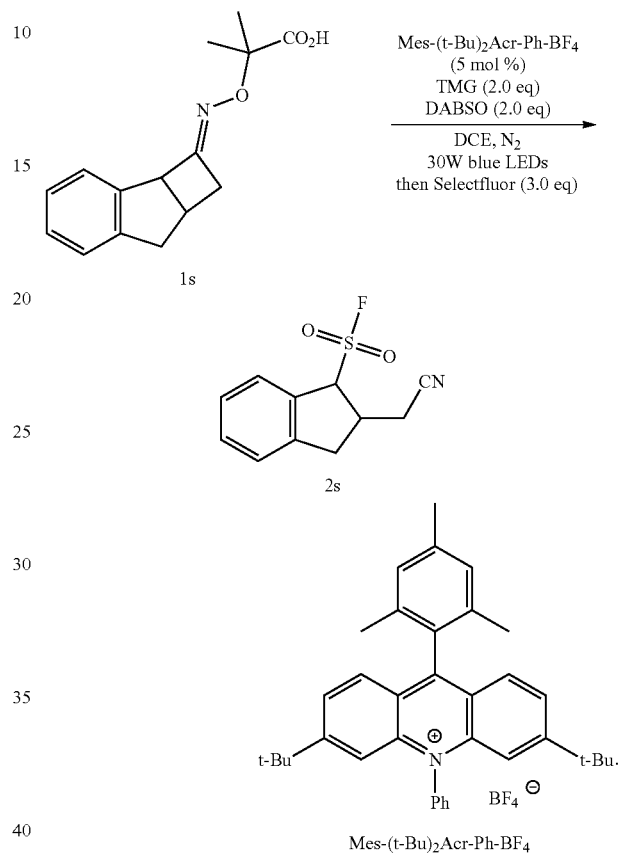

0.1 mmol of 1s is added to a dry Schlenker reaction tube, and then 0.005 mmol of Mes-(t-Bu)₂Acr-Ph-BF₄, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na₂SO₄, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 90%.

The data of hydrogen spectrum, carbon spectrum, fluorine spectrum and high resolution mass spectrum of the product are as follows:
¹H NMR, 400 MHZ, chloroform: δ 7.36-7.28 (m, 4H), 4.14-4.05 (m, 2H), 3.64-3.51 (m, 2H), 3.08-2.94 (m, 2H);
¹³C NMR, 101 MHz, chloroform: δ 138.1 (d, J=1.5 Hz), 137.8, 129.2, 128.3, 124.9, 123.4, 116.5, 63.6 (d, J=15.3 Hz), 43.2, 33.5, 21.9;
19F NMR, 377 MHz, chloroform: δ 47.7;
HRMS (ESI) m/z calcd. for ChHnFNO2S [M+H]+ 240.0490, found 240.0490.

Embodiment 24

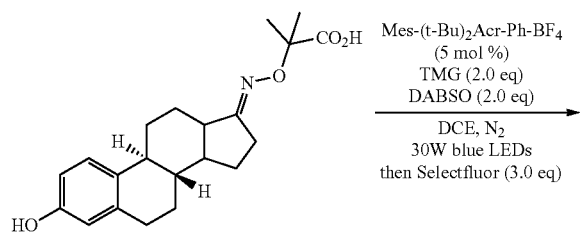

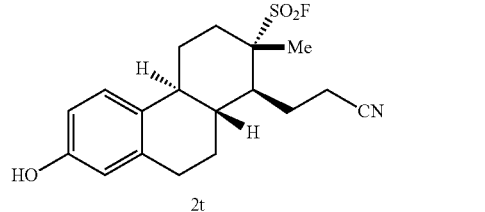

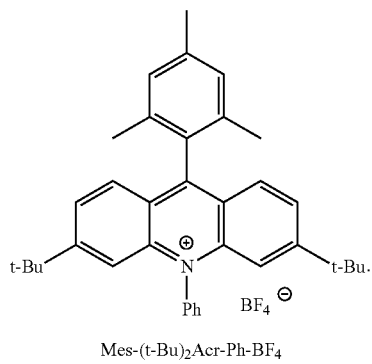

0.1 mmol of 1t is added to a dry Schlenker reaction tube, and then 0.005 mmol of Mes-(t-Bu)$_2$Acr-Ph-BF$_4$, 0.2 mmol of DABSO, 0.2 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.3 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 2:1, and the colorless oily product is obtained with a yield of 64%, m.p. 168-170° C.

The data of hydrogen spectrum, carbon spectrum, fluorine spectrum and high resolution mass spectrum of the product are as follows:

1H NMR, 400 MHZ, dichloromethane: 87.12-7.09 (m, 1H), 6.65-6.62 (m, 1H), 6.57-6.55 (m, 1H), 4.98 (s, 1H), 2.93-2.80 (m, 2H), 2.56-2.08 (m, 8H), 1.85-1.71 (m, 2H), 1.56 (s, 3H), 1.51-1.37 (m, 3H);

13C NMR, 101 MHZ, dichloromethane: 8154.4, 137.9, 130.7, 126.9, 115.3, 115.2, 113.5, 70.6 (d, J=6.4 Hz), 45.2, 42.7, 42.5 (d, J=1.2 Hz), 34.2, 30.2, 27.2, 26.1, 25.6, 18.1, 14.9;
19F NMR, 377 MHz, dichloromethane: 851.7, 36.9;
HRMS (ESI) m/z calcd. for C$_{18}$H$_{23}$FNNaO3S [M+H]+ 374.1197, found 374.1198.

Embodiment 25

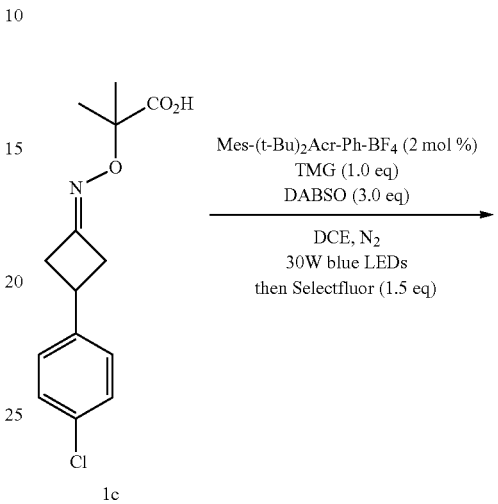

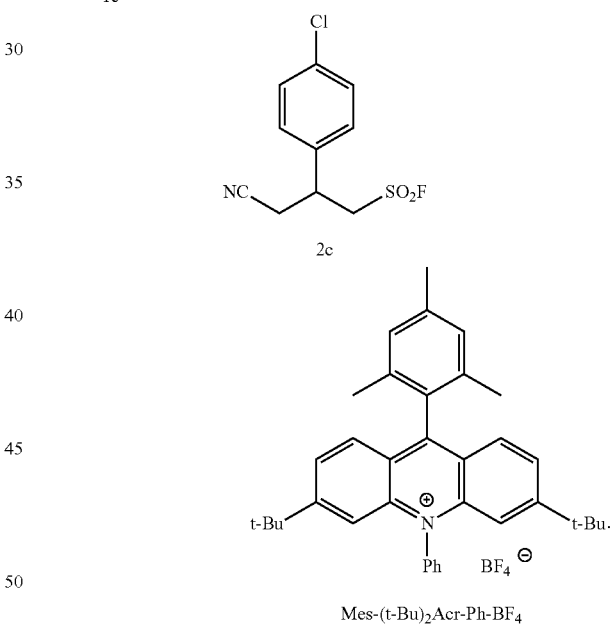

0.1 mmol of 1c is added to a dry Schlenker reaction tube, and then 0.002 mmol of Mes-(t-Bu)$_2$Acr-Ph-BF$_4$, 0.3 mmol of DABSO, 0.1 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.15 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 81%.

Embodiment 26

The synthetic route is:

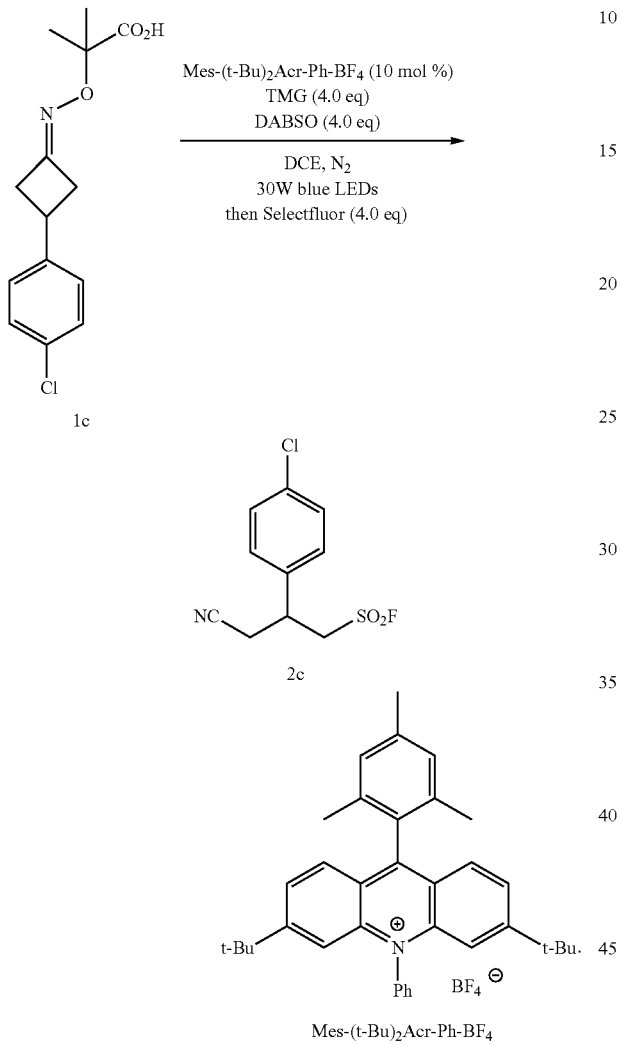

0.1 mmol of 1c is added to a dry Schlenker reaction tube, and then 0.01 mmol of Mes-(t-Bu)$_2$Acr-Ph-BF$_4$, 0.4 mmol of DABSO, 0.4 mmol of tetramethylguanidine and 4.0 mL of dichloroethane are added under nitrogen atmosphere. A reaction mixture is irradiated with a blue LED lamp with a wavelength of 460 nm and stirred for 1 hour at room temperature.

Then, 0.4 mmol of Selectfluor is added, and the reaction mixture is stirred for an addition hour. The mixture is then extracted with ethyl acetate, and the organic layers are combined. The combined organic layers are washed with saturated saline solution, dried with Na$_2$SO$_4$, filtered and concentrated. Further purification is performed by column chromatography or preparative thin-layer chromatography on silica gel; the eluent is petroleum ether and ethyl acetate with a volume ratio of 5:1, and the colorless oily product is obtained with a yield of 93%.

The method of the present disclosure is used to synthesize a variety of functional group-substituted distal cyano sulfonyl fluoride, and its typical structure and reaction yield are shown above. The disclosed molecular structural formula of the multi-substituted cyano sulfonyl fluoride compound is not taken as a limitation on the protection scope of the present disclosure.

It should be noted that when numerical ranges are involved in the present disclosure, it should be understood that two endpoints of each numerical range and any numerical value between the two endpoints may be selected. Because the steps and methods adopted are the same as those of the embodiments, the present disclosure describes optional embodiments to avoid redundancy. Although the optional embodiments of the present disclosure have been described, those skilled in the art may make additional changes and modifications to these embodiments once they know the basic inventive concepts. Therefore, the appended protection scope is intended to be interpreted as including the optional embodiments and all changes and modifications that fall within the scope of the present disclosure.

Obviously, those skilled in the art may make various modifications and variations to the present disclosure without departing from the spirit and scope of the present disclosure. Thus, if these modifications and variations of the present disclosure are within the scope of protection of the present disclosure and its equivalent technology, the present disclosure is also intended to include these modifications and variations.

What is claimed is:

1. A method for preparing cyano sulfonyl fluoride compounds comprises following steps:
in an organic solvent, using oxime ether compounds as free radical precursors, and in a protective atmosphere, adding photocatalyst, sulfur dioxide source and organic base free radical initiator, and stirring a mixture under an illumination condition to allow the oxime ether compounds to subject to photocatalytic oxidation and reduction to generate nitrogen free radicals, and followed by C—C bond cleavage rings and free radical SO$_2$ insertion;
subsequently, adding fluorine source to undergo fluorination, and achieving cyano/fluorosulfonyl reaction of oxime ether to obtain the cyano sulfonyl fluoride compounds;
wherein a general reaction formula is as follows:

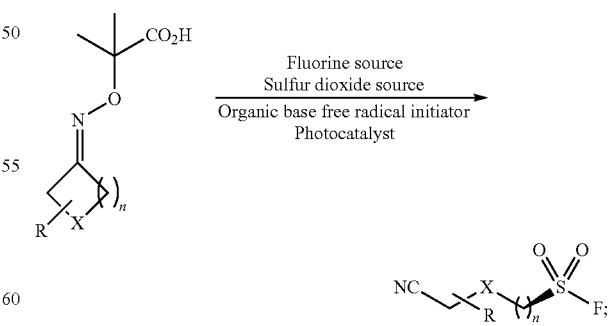

wherein R is one of hydrogen, alkyl, aryl, ester group and heterocyclic ring, X is one of carbon, oxygen and sulfur, n is one of 1, 2 and 3, and the sulfur dioxide source is 1,4-diazabicyclo[2.2.2] octane-1,4-dium-1,4-disulfonic acid; and the fluorine source is a selective fluorine reagent, the sulfur dioxide source is DABSO, the organic base free radical initiator is tetramethylguanidine, the organic solvent is dichloroethane, the photocatalyst is 4CzIPN, Eosin Y, TPT, Mes-Acr-Me-ClO$_4$ or Mes-(t-Bu)$_2$Acr-Ph-BF$_4$, and photocatalytic irradiation wavelength is 460 nm.

2. The method for preparing the cyano sulfonyl fluoride compounds according to claim 1, wherein a molar ratio of the oxime ether compounds to the photocatalyst is 1:0.02-0.1, and a molar ratio of the oxime ether compounds to the sulfur dioxide source is 1:2-4.

3. The method for preparing the cyano sulfonyl fluoride compounds according to claim 1, wherein a molar ratio of the oxime ether compounds to the organic base free radical initiator is 1: 1-4.

4. The method for preparing the cyano sulfonyl fluoride compounds according to claim 1, wherein a molar ratio of the oxime ether compounds to the fluorine source is 1:1.5-4.

5. The method for preparing the cyano sulfonyl fluoride compounds according to claim 1, wherein the illumination condition is that LED lamps are used for illumination, irradiation duration is 0.8-1.2 hours, reaction temperature is room temperature, and reaction duration is 2-2.5 hours.

* * * * *